Feb. 26, 1963  C. E. WEIR ETAL  3,079,505
HIGH-PRESSURE OPTICAL CELL
Filed Aug. 26, 1960  3 Sheets-Sheet 1

INVENTORS
Ellis R. Lippincott
Charles E. Weir
Alvin Van Valkenburg

BY
ATTORNEYS

Feb. 26, 1963

C. E. WEIR ETAL 3,079,505

HIGH-PRESSURE OPTICAL CELL

Filed Aug. 26, 1960

INVENTORS
Ellis R. Lippincott
Charles E. Weir
Alvin Van Valkenburg

BY David Robbins
John C. Stahl
ATTORNEYS

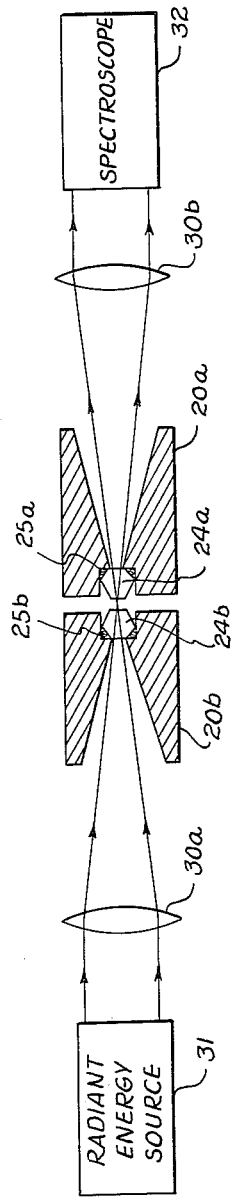

United States Patent Office 3,079,505
Patented Feb. 26, 1963

3,079,505
HIGH-PRESSURE OPTICAL CELL
Charles E. Weir, Washington, D.C., Alvin Van Valkenburg, McLean, Va., and Ellis R. Lippincott, Hyattsville, Md., assignors to the United States of America as represented by the Secretary of Commerce
Filed Aug. 26, 1960, Ser. No. 52,316
2 Claims. (Cl. 250—83)

The present invention relates to a cell to be utilized in the spectrum analysis of solid materials and more particularly to a cell wherein solid materials may be analyzed in the spectral region of 1–4µ and from 5.2µ to beyond 30µ under calculated pressures between 1 atmosphere and 160,000 atmospheres.

In recent years the short-range interatomic forces and perturbing effects of neighboring atoms on each other have become of increasing interest. The perturbation is a function of the interatomic distance and any serious study of this effect in condensed systems requires measurements involving systematic changes in the spacings. Two parameters are immediately available for systematically varying the interatomic distances in a given structure-pressure and temperature. The variation produced by temperature changes is limited by the expansivity of the material and for solids cannot exceed the limits imposed by the melting point and the absolute zero of temperature. For some purposes wide changes in temperature are undesirable because of the concomitant change in the thermal (kT) energy involved. The effect produced by changes in pressure is of considerably more interest since relatively large changes in spacing may be produced with moderate pressures, i.e., 50,000 atmospheres, with no accompanying change in the kT energy.

Spectroscopy can be applied in this field since the frequencies of the absorption bands are determined by the characteristics of the molecular units present, such as the masses of the oscillating units, the forces between them, and the force fields of adjacent molecules. Intensities of these bands are functions of the electrical properties (dipole moments) and the number of the individual oscillators, as well as their distance from one another. When a specimen is compressed, these properties are modified by the reduced interatomic distances.

The prior art includes studies of such effects by the infrared absorption method to pressures of 12,000 atmospheres, but with a 0.2µ to 4µ spectral range imposed by the cutoff of the windows used in the apparatus. The frequencies for many important modes of vibration are not to be found in this spectral region.

The pressure cell of the subject invention consists of two type II diamonds which are transparent from 1 to 4µ and 5.2µ to beyond 30µ. The specimen is compressed between the diamond surfaces at pressures ranging between 1 atmosphere and 160,000 atmospheres, the incident beam of irradiation traverses both the diamonds and the specimen parallel to the direction of the stress with little attenuation. Utilizing such a cell, upon the application of pressure, the absorption spectrum of a substance shows a number of changes, including shifts of absorption bands to both higher and lower frequencies from the positions of the band at 1 atmosphere, the occurrence of new bands, the splitting of degenerate bands arising from a change in selection rules and changes in apparent band intensity.

It is therefore an object of the present invention to permit the study of solid materials in spectral regions under pressures which have not heretofore been available.

Another object of this invention is to extend the region of study of solid materials further into the infrared.

It is a further object of this invention to provide an apparatus which can be used rapidly and easily in a semi-routine fashion on commercial instruments.

A still further object of this invention is to employ a very small specimen in such apparatus.

Other objects and features of the invention will become apparent to those skilled in the art as the disclosure is made in the following detailed description of a preferred embodiment of the invention as illustrated in the accompanying sheets of drawings in which.

Figure 6A:
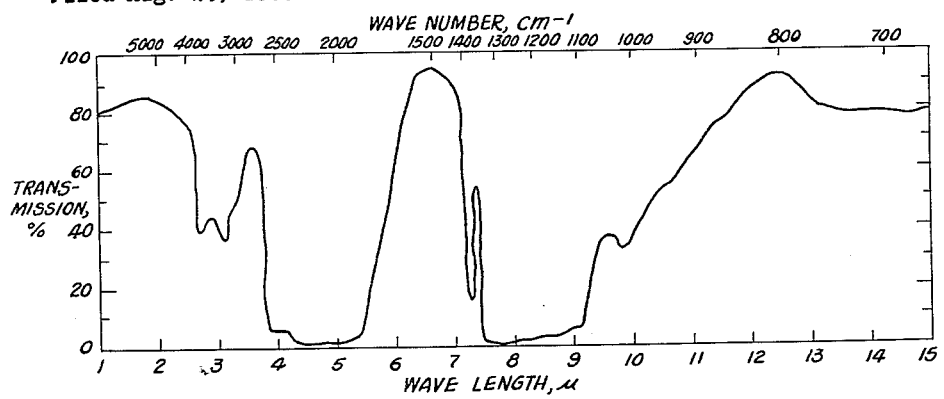
Figure 6B:
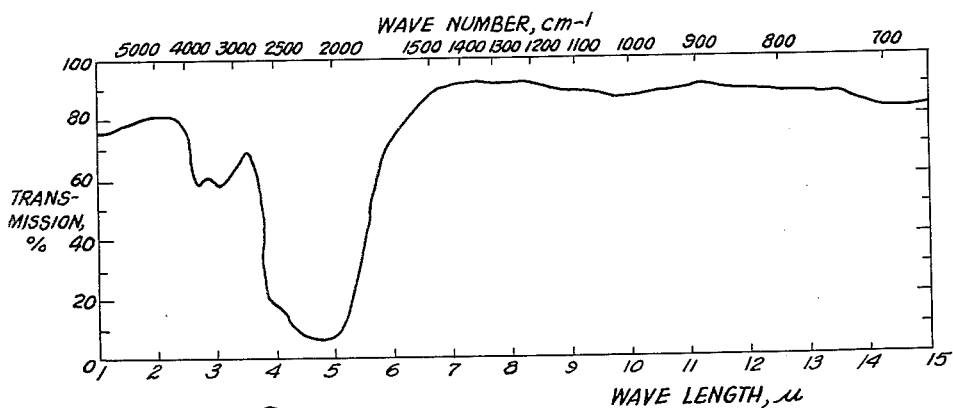
Figure 1:
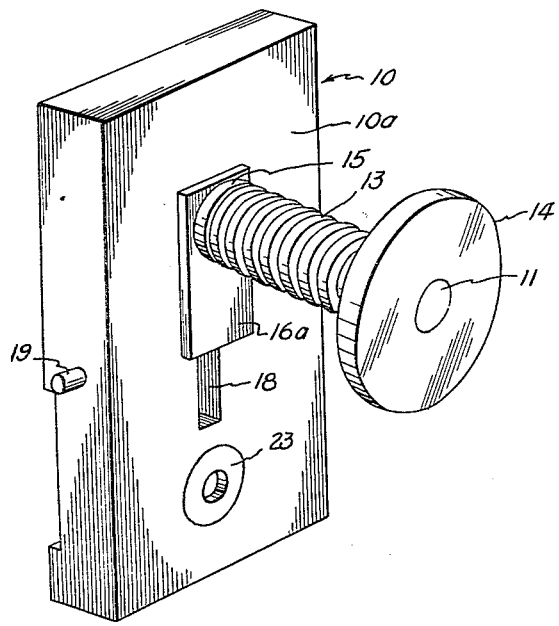
FIG. 1 is an isometric view of the high-pressure cell of this invention.
Figure 4:
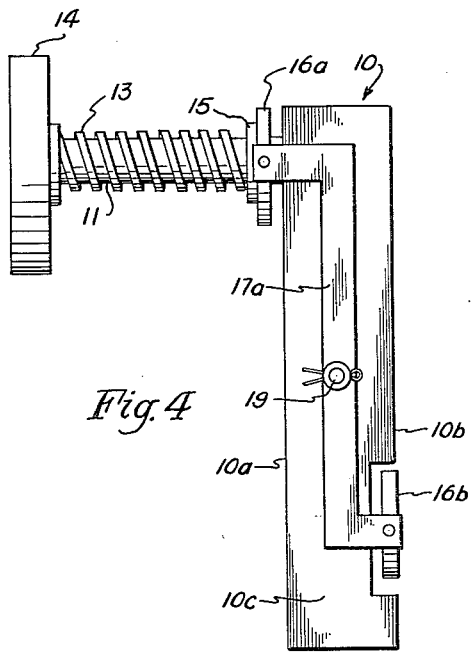
Figure 5A:
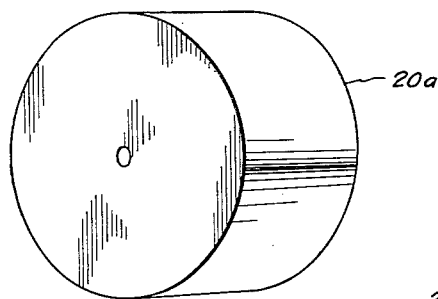
Figure 5B:
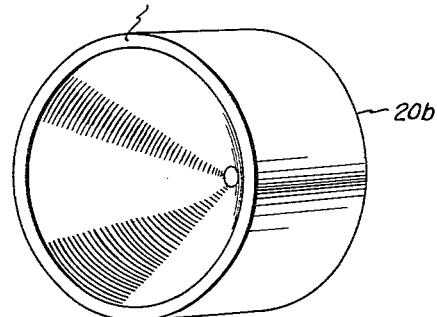

FIG. 3A discloses a system incorporating the present invention;

FIG. 4 is a side-elevational view of a modification of the device of FIG. 1;

FIGS. 5A and 5B are isometric views of the front and back, respectively, of the diamond holders of this invention;

FIG. 6A illustrates an infrared transmission spectra for a typical type I diamond; and FIG. 6B illustrates an infrared transmission spectra for a typical type II diamond.

Referring now to the drawings, wherein like reference characters designated like or corresponding parts throughout the several views, there is shown in FIG. 1 a casing 10 comprising the body of the cell. This casing is preferably composed of cold-rolled steel and is approximately 1 inch thick, 3 inches in width and 6 inches in length and is suitable for mounting in a conventional beam condensing unit.

Figure 2:
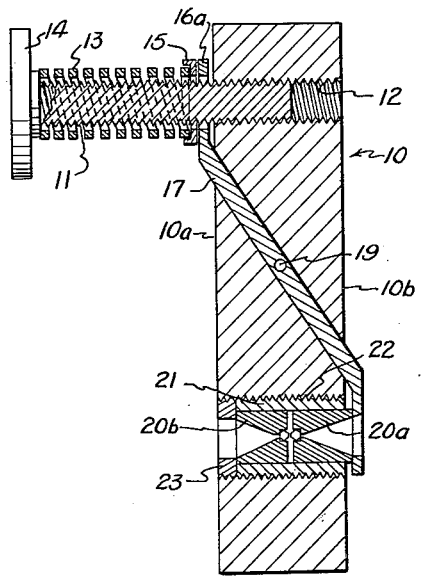
FIG. 2 is a cross-sectional view of the high-pressure cell of FIG. 1.

As best seen in FIG. 2 of the drawings, a spindle 11 threadingly inserts into a bushing 12 in the upper portion of casing 10. A calibrated spring 13 is positioned concentric about the spindle 11, the outboard end of said spring abuts a head 14 integral with said spindle while the inboard end of said spring abuts an annular collar 15. An upper thrust plate 16a (see FIG. 1) contains a bore through which the spindle passes, said plate 16a is positioned between collar 15 and the front 10a of the casing.

Still referring to FIG. 2, it is evident that the upper thrust plate and a lower presser plate 16b (see FIG. 4) are positioned adjacent to sides 10a—10b, respectively, of the casing, said plates 16a—16b are integrally connected as by arm 17 or the like which passes through an elongated aperture 18 in the casing and is pivotally connected thereto by pin 19. Alternatively, the upper and lower plates may be connected by a lever arrangement whereby the arms 17a (only one of which is shown) are pivotally connected to the sides of the casing as best seen in the modification of FIG. 4. It is to be understood, of course, that although the lever arms 17 and 17a are of equal length in the disclosed embodiments, the proportions thereof may be varied to produce different pressure ranges using the same compression spring 13.

The lower presser plate 16b bears against a first diamond holder 20a, said plate is bored out to permit entrance of the convergent cone of irradiation which is to pass through holders 20a—20b, respectively.

Figure 3:
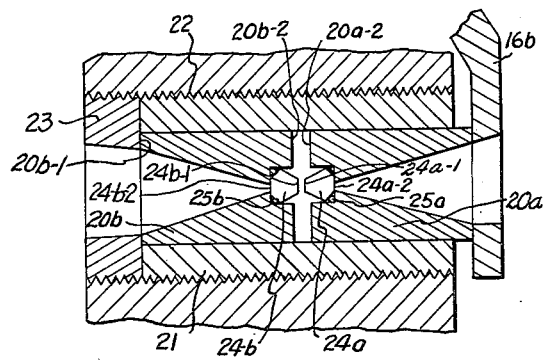
FIG. 3 is a detailed cross-sectional view taken through the diamond holders in the lower portion of FIG. 2.

Referring now to FIGS. 2 and 3 of the drawings, a Dural bearing 21 threadingly inserts into a bushing 22 in the lower portion of casing 10, the first and second diamond holders 20a—20b (see FIGS. 5A—5B) are positioned back-to-back within said bearing and are free to slide therein. An annular thrust bearing 23 screwably inserts into bushing 22 and bears against an annular shoulder 20b–1 of the holder 20b. In operation, the position of the holders 20a—20b may be varied by moving the thrust plate 16a so that the presser plate 16b is perpendicular to the diamonds, hereinafter to be discussed in detail. This positioning ensures the absence of components of force at right angles to the thrust axis, a uniaxial force is, therefore, applied to a specimen contained between two flat surfaces of the diamonds.

In the preferred embodiment of the invention, two gem-cut type II diamonds 24a—24b, each weighing 0.036 gram, comprise the squeezer anvils. The culets of each diamond are ground off to form small flats, 24a-1—24b-1, parallel to the tables, 24a-2—24b-2. The specimen is to be placed between these small flats which have an area of approximately 0.002 in². As best seen in FIGS. 2 and 3, the diamond holders 20a—20b, heretofore described, are recessed to permit the seating of the diamonds on their respective tabular faces with the ground off culets projecting above surfaces 20a-2—20b-2 of the respective holders. Each of said seats is approximately 0.100" in diameter and extends approximately 0.06" below surfaces 20a-2—20b-2. Annular rings 25a—25b, preferably of rubber or the like, insert into the seats to permit alignment of the respective diamonds under pressure. The holders are then bored out conically (see FIG. 5B) to permit acceptance of the maximum flux from the convergent cone of infrared radiation. In this manner, the specimen is located at the focus of the beam of irradiation.

Referring now to FIG. 3A, the holders 20a—20b and annular rings 25a—25b position diamonds 24a—24b at the focal point of lenses 30a—30b, which are located in a conventional beam condensing unit. Thus, energy in a selected spectral region, obtained from radiant energy source 31, may be applied to diamond 24b and a spectral analysis of the energy transmitted through diamond 24a may be performed with spectroscope 32.

As heretofore described, for infrared studies at high pressures, the composition of the window is of prime importance. For example, for transmission purposes the alkali halides are ideal but they are mechanically weak and not generally suited for pressure work. On the other hand, diamonds are suitable for high-pressure work because of their strength, however, not all diamonds are transparent in the infrared range. As is well known, natural diamonds may be classified into two main categories known as types I and II. Type I diamonds comprise at least 98% of all diamonds but are not particularly useful for windows since they contain strong absorption bands in the infrared. Type II diamonds, however, are relatively transparent with the exception of a strong absorption band between 4 and 5.5 $\mu$. FIG. 6A shows a typical transmission curve for a type I diamond whereas FIG. 6B illustrates a transmission curve for a type II diamond used in a pressure cell. In connection with FIG. 6A, the path length in the diamond is of the order of ¼ inch.

The load is determined by measuring the compression of the spring 13. In the preferred embodiment of the invention, compression spring 13 contains 20 threads per inch. The pressures are calculated values obtainable by dividing the load by the area of the smaller of the two diamond faces, neglecting frictional forces. Alternatively, the thrust transmitted by the specimen may be measured by determining the resistance of a small coil of manganin wire placed under the thrust plate 16a, if greater precision is desired. When 70 pounds force was applied, for example, pressures between the diamond faces exceed 400,000 lbs./in.² With a diamond surface of 0.0001 sq. in. a load of 75 pounds produces a pressure of 750,000 p.s.i.

The substance to be studied was generally ground to a fine powder, quantities of only a few tenths of a milligram being required to study the characteristics of a single compound. The diamond holder 20a is inserted in the bearing 21 and a small quantity of powder placed on the surface with a small spatula. The second diamond holder 20b is then placed back-to-back with respect to holder 20a and the thrust bearing 23 screwed into place.

Raising the pressure to approximately 10,000 atmospheres in a manner heretofore described by manually rotating the head 14 produces a clear film between the diamond faces. The cell is then positioned in the focal point of a conventional beam-condensing unit, as shown in FIG. 3A, and its position adjusted in the beam to produce a maximum transmission in a spectral region containing no strong bands. Pressure is reduced to a low value (ca. 3,000 atmospheres) and the spectrum scanned completely; pressure is then raised to a higher value and the steps repeated until the maximum pressure is achieved.

The pressure cell may be set up on a conventional microscope stage and the diamonds and the specimen observed at all pressures at low magnification. Slight modification of the cell or the use of long focal length objectives permits higher magnification.

To study strong absorption bands in detail the solid materials may be diluted with KBr or LiF. Dilutions are generally made by grinding the components either in 1 to 1 or 2 to 1 proportions and proceeding as before. Lithium fluoride shows little or no extrusion but in dilute mixtures evidence of interaction with the dispersed substance has been observed. However, with LiF the complete range may not be studied as this material absorbs strongly above 14.5$\mu$. KBr has been found to extrude rapidly under pressure.

Since the diamond faces have an area of approximately 1 to $2 \times 10^{-4}$ in.², only a portion of the incident I.R. beam is accepted by the cell. Restriction of the reference beam to permit utilization of the full scale of the recorder, therefore, may be required. A suitable screen or perforated sheet aluminum may be placed in the reference beam. The low available energy necessitates operation at high gain and slow scanning speed. Scanning speeds vary from 0.08 to 0.5$\mu$/minute with a slit program usually from three to four times that for the standard program of the instrument.

In a further modification of the subject invention, the diamond holders may be thermally isolated from the remainder of the cell. Alternatively, said diamond holders may be provided with coils encompassing said holders whereby the temperature may be controlled from an external source.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A device for performing spectrum analysis of solid materials comprising: a casing, first and second holding means, each having an aperture, means for movably mounting said first and second holding means in said casing so that the aperture of said first holding means is opposite the aperture of said second holding means, a first and second diamond, each transparent throughout a spectral region extending from approximately 6 microns to at least 15 microns and positioned in the aperture of said first and second holding means, respectively, force producing means, means for coupling pressure from said force producing means to said first and second holding means, means for applying energy in a selected spectral region to said first diamond, and means for performing a spectral analysis of the energy transmitted through said second diamond.

2. A device for performing spectrum analysis of solid material comprising: a casing, a first and second holding means, each having an aperture, means for movably mounting said first and second holding means in said casing so that the aperture of said first holding means is opposite the aperture of said second holding means, a first and second diamond, each transparent throughout a spectral region extending from approximately 6 microns to at least 15 microns and positioned in the aperture of said first and second holding means, respectively, a spindle rotatably mounted in said casing, a compression spring mounted concentric about said spindle in such a manner that the spring is compressed when the spindle is rotated in a selected direction, a thrust plate adapted to be energized by said spring, a pressure plate positioned adjacent to said first holding means, means for coupling said thrust plate to said pressure plate, means for applying energy in a selected spectral region to said first diamond, and means for performing a spectral analysis of the energy transmitted through said second diamond.

References Cited in the file of this patent

UNITED STATES PATENTS 2,332,674    Smith  ------------------ Oct. 26, 1943